United States Patent [19]

Slazas et al.

[11] 4,087,970

[45] May 9, 1978

[54] HYDROSTATIC TRANSMISSION CONTROL

[75] Inventors: John J. Slazas, Cedarburg; Arno Gunther, Port Washington, both of Wis.

[73] Assignee: Allis-Chalmers Corporation, Milwaukee, Wis.

[21] Appl. No.: 780,544

[22] Filed: Mar. 23, 1977

Related U.S. Application Data

[63] Continuation of Ser. No. 536,032, Dec. 23, 1974, abandoned.

[51] Int. Cl.$^2$ ............... F16D 39/00; F16H 25/08; F16H 25/16

[52] U.S. Cl. ............................. 60/487; 74/54; 74/60; 74/470; 74/491; 92/12.2; 92/13.3

[58] Field of Search ............... 92/12.1, 12.2, 13.3, 92/13.41, 60.5, 71; 74/60, 54, 96, 470, 491; 91/504; 60/487, 492; 180/6.48, 77 H, 77 HT

[56] References Cited

U.S. PATENT DOCUMENTS

| | | | |
|---|---|---|---|
| 2,269,504 | 1/1942 | Anderson | 74/54 |
| 2,660,901 | 12/1953 | Latzen | 74/470 |
| 3,370,424 | 2/1968 | Swanson | 60/492 |
| 3,385,120 | 5/1968 | Nott | 74/107 |
| 3,398,691 | 8/1968 | Sato | 92/13.7 |
| 3,488,955 | 1/1970 | Buelow | 60/492 |
| 3,772,937 | 11/1973 | Takagi | 74/491 |
| 3,896,680 | 7/1975 | Shoemaker | 74/96 |
| 3,906,842 | 9/1975 | Sonobe | 92/13.7 |
| 3,911,792 | 10/1975 | Heyl | 92/12.1 |
| 3,938,401 | 2/1976 | Bauer | 92/12.2 |

FOREIGN PATENT DOCUMENTS

| | | | |
|---|---|---|---|
| 283,754 | 4/1915 | Germany | 74/54 |

*Primary Examiner*—Martin P. Schwadron
*Assistant Examiner*—Abraham Hershkovitz
*Attorney, Agent, or Firm*—Charles L. Schwab

[57] ABSTRACT

A hydrostatic transmission drive pump swash plate control including a control arm and a cam which are mounted on axes perpendicular to one another. The control arm is connected to the swash plate to effect simultaneous movement of the control arm and swash plate. Cushioned link means operatively interconnect the cam and a manual control member. The cam includes a cylindrical portion with a cam slot which is shaped similar to the first 90° of a sine wave between full speed reverse and neutral and similar to the first 90° of another sine wave from neutral to full forward speed. A resilient cam roller on the control arm absorbs fluctuating stroking forces of the pump and cooperatively engages the cam slot to produce a low rate of ground speed change near the neutral condition of the hydrostatic transmission and also near maximum forward and maximum reverse ground travel speed. The cam is axially adjustable to provide alignment between the neutral position of the swash plate and the neutral position of the cam slot. Adjustment means are also provided to align the neutral position of the cam with the neutral position of the manual control member.

2 Claims, 6 Drawing Figures

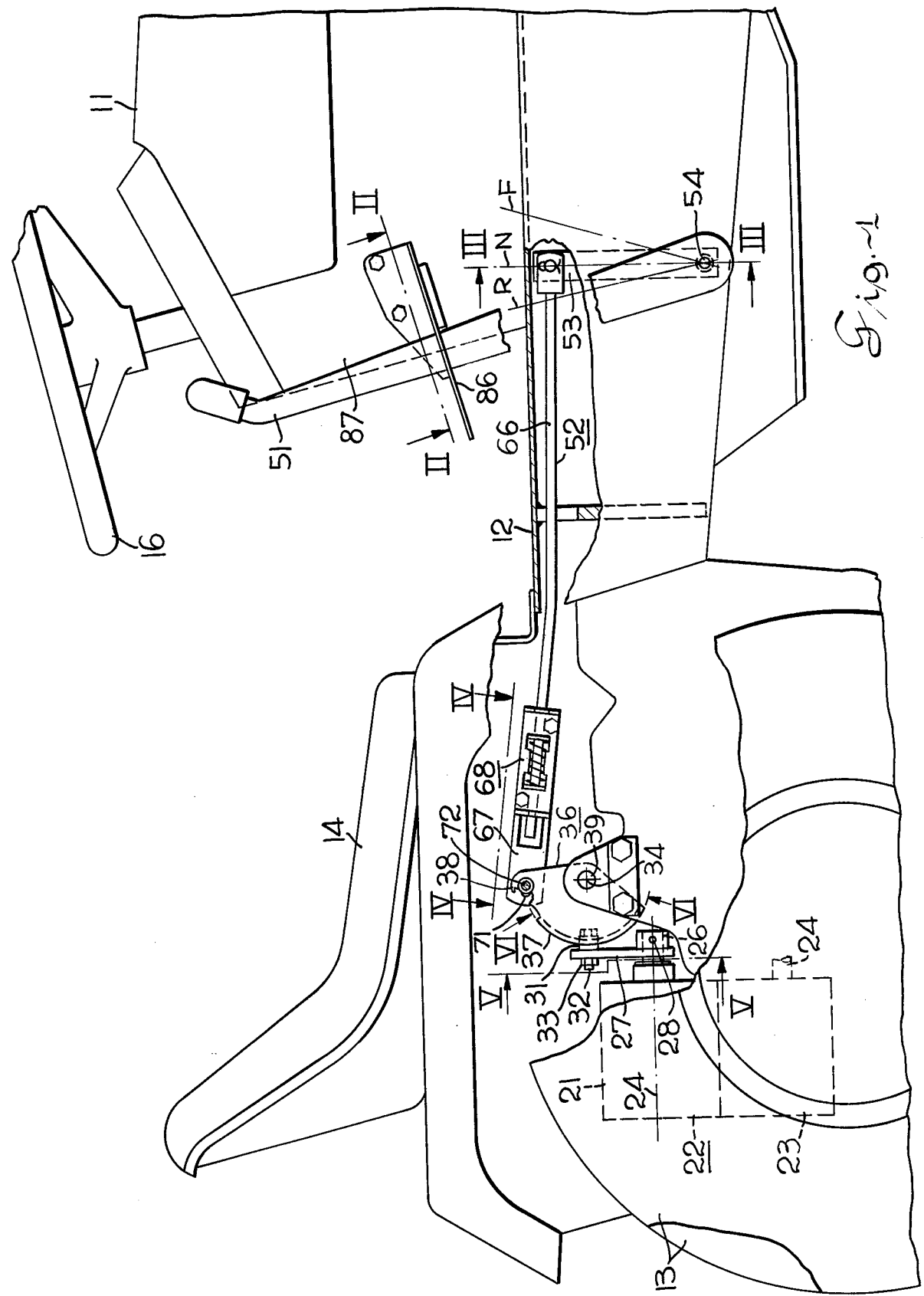

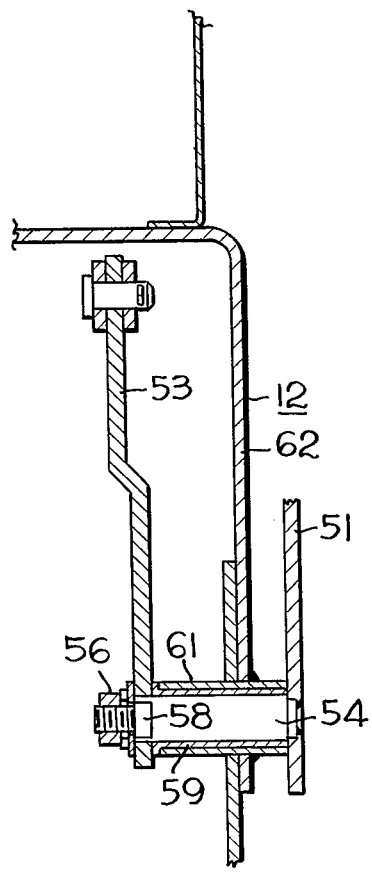
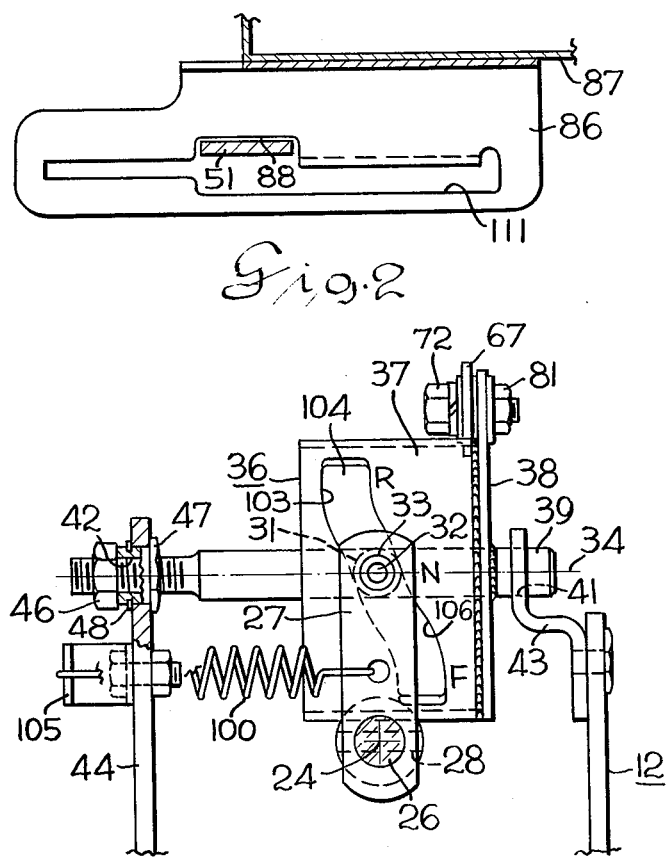
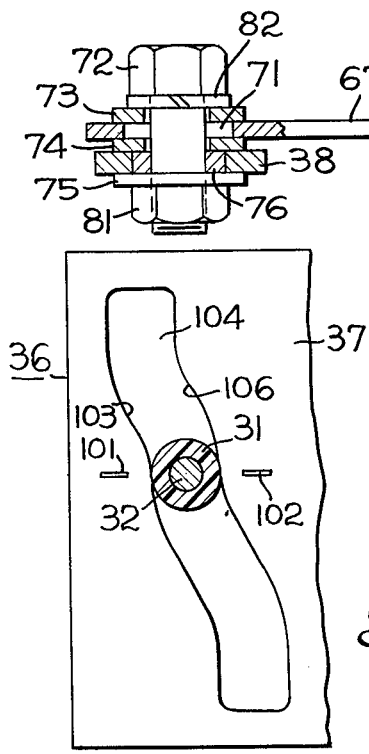
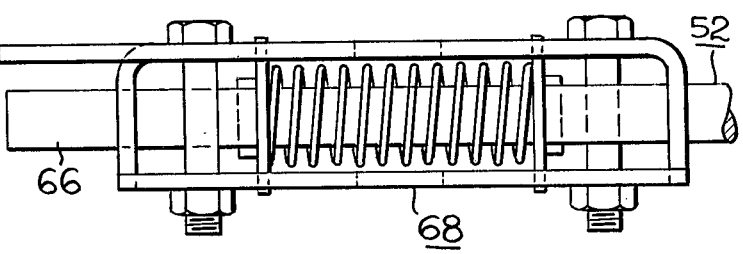

HYDROSTATIC TRANSMISSION CONTROL

This is a continuation of application of application Ser. No. 536,032 filed Dec. 23, 1974, now abandoned.

BACKGROUND OF THE INVENTION

It is common practice to provide a pivotable cam for engaging a follower on a control arm of a swash plate pump of a hydrostatic transmission. U.S. Pat. Nos. 3,488,955 and 3,370,424 show such hydrostatic transmission controls. In both of these patents, the cam rotates about an axis which is parallel to the axis of the swash plate control arm.

The present invention provides a hydrostatic transmission control which is believed smoother operating and which has superior accelerating and decelerating characteristics as compared with known prior art hydrostatic transmission controls.

SUMMARY OF THE INVENTION

A manually operated control is provided for a hydrostatic transmission which includes a cylindrical cam disposed on an axis perpendicular to the axis of the control arm of a swash plate pump. The cylindrical portion of the cam includes a slot having a special shape to provide smooth gentle acceleration in both directions from neutral. The cam is axially adjustable to permit alignment of the mechanical neutral of the cam with the hydraulic neutral of the pump. A cam follower in the form of a resilient plastic roller on the swash plate control arm reduces wear and noise which heretofore occurred between metal cams and metal cam followers in hydrostatic controls. A manual control lever at the operator's station has a neutral position and a cushioned linkage between the manual control lever and the cam includes an adjustable connection permitting alignment of the neutral position of the manual control lever and the neutral position of the cam.

BRIEF DESCRIPTION OF THE DRAWINGS

The invention is illustrated in a lawn and garden tractor by the drawings in which:

FIG. 1 is a partial side view of the tractor with parts broken away for illustration purposes;

FIG. 2 is a section view taken along the line II—II in FIG. 1;

FIG. 3 is a section view taken along the line III—III in FIG. 1;

FIG. 4 is a section view taken along the line IV—IV in FIG. 1;

FIG. 5 is a section view taken along the line V—V in FIG. 1; and

FIG. 6 is a section view taken along curved line VI—VI in FIG. 1.

DETAILED DESCRIPTION OF THE INVENTION

Referring to FIG. 1, the lawn and garden tractor 11 includes a main frame 12 supported at its front end by its steerable wheels, not shown, and at its rear end by a pair of drive wheels 13. An operator's seat 14 is provided at the rear of the tractor and a conventional steering wheel 16 is provided for vehicle steering purposes. An engine, not shown, is connected in driving relation to a pump 21 of a hydrostatic transmission 22 by suitable means, not shown. The hydrostatic transmission 22 is mounted on the frame 12 and includes a hydraulic motor 23 having an output shaft 24 connected through an appropriate gear train, not shown, to the drive wheels 13. The hydraulic pump 21 is of the swash plate type having a swash plate tiltable to either side of a neutral position to vary the direction and volume of fluid delivered to the motor 23. The swash plate is tiltable about an axis 24 and includes an axially extending end part 26 to which a swash plate control arm 27 is nonrotatably secured by a pin 28. A resilient cam roller 31 is rotatably mounted on the outer end of the control arm 27 in spaced relation to its pivot axis 24 by a bolt 32 extending through a suitable opening in the control arm 27 and held in place by a nut 33. The control arm is moved from its illustrated neutral position to forward and reverse positions by a cam 36 which is pivotally mounted on the frame 12 of the tractor on a transverse pivot axis 34 which is perpendicular to the axis 24.

Referring also to FIG. 5, the cam 36 includes a cylindrical portion 37, which is rigidly secured by welding to a side plate 38, and a shaft 39 which is welded to the side plate 38. The shaft 39 is pivotally mounted in bores 41, 42 in upstanding brackets 43, 44 on the frame 12. The shaft 39 has a sliding fit with the bore 41 permitting it to be adjusted axially upon loosening a lock nut 46 and turning nut 47 on the threaded end of the shaft 39 until the desired axial position of the shaft 39 is obtained. The locking nut 46 is then retightened. The nut 47 is held axially in place on the bracket 44 by a snap ring 48. The cam 36 is connected to a manual control member in the form of an upstanding lever 51 by link means comprising a link 52 pivotally connected at its forward end to the upper end of a lever arm 53, which is nonrotatably secured at its lower end to a shaft 54 by a nut 56. The lower end of the lever arm 53 includes an oblong slot through which a flattened portion 58 of the shaft 54 extends. The lever 51 is welded at its lower end to the shaft 51. The shaft 54 is pivotally mounted in a bushing 59 in a cylindrical support 61 welded to a wall 62 of the frame 12. The link 52 includes a rod part 66 and a flat strap metal part 67 which are interconnected by a springloaded cushioning device 68 as illustrated in FIGS. 1 and 4. The rear end of strap 67 includes an elongated slot 71 through which a bolt 72 extends. The bolt 72 extends through lock washer 82 and flat washers 73, 74, 75 and also through a spacer 76 which is slightly thicker than the upper end of the plate 38 of cam 36. A nut 81 secures the parts in assembly. The bolt 72 together with bushing 76 and slot 71 provides an adjustable pivotal connection between the link 52 and the cam 36.

The manual control lever 51 cooperates with a quadrant 86 fastened to a sidewall 87 mounted on the frame 12. In FIGS. 1 and 2 the lever 51 is disposed in its neutral position. The quadrant 86 has a neutral notch 88 in which the control lever 51 fits. The control lever 51 acts like a resilient leaf spring and its upper end is biased toward the neutral notch 88. When the control lever 51 is in its neutral position as illustrated in FIGS. 1 and 2, the cam roller 31 is aligned with the neutral indentations 101, 102 on the cam 36 as shown in FIG. 6. On assembly of the tractor or thereafter, the mechanical neutral setting of the control lever 51 can be aligned with the mechanical neutral position of the cam 36 by loosening the nut 81 and sliding the bolt 72 longitudinally in the slot 71 until the axis of the cam roller 31 aligns with the neutral indentation marks 101, 102, then the nut 81 is retightened.

The cam roller 31 is a resilient plastic roller pivotally mounted on the bolt 32. The threaded end of the bolt 32 is of a smaller diameter than the diameter of shank portion of the bolt whereby the bolt is held firmly on the arm 27 by the nut 33 without squeezing the roller 31. A tension spring 100 is disposed between and interconnects the arm 27 and a spring mounting part 105 on the bracket 44 of the frame 12. The tension spring 100 hold the roller 31 against a cam surface 103 of a cam slot 104 in the cylindrical portion 37 of the cam 36 and thereby forces the resilient roller 31 to always ride the cam surface 103. This reduces undesirable fluctuating movement of the roller between the cam surface 103 and its parallel camming surface 106 defining the other side of the slot 104. The camming surfaces 103, 106 are constructed substantially in the form of the first 90° of a sine wave from one end to neutral and then substantially in the form of the first 90° of a second sine wave from neutral to the other end of the cam surface. The configuration is such that the rate of change of pump output as the control is moved from the neutral setting will be very gradual and then the rate of change becomes greater as the roller rides on the steeper slope of the curve. The rate of change becomes gradual again near maximum forward and maximum reverse. This curvature of the cam surface provides smooth accelerating movement of the tractor, thus avoiding unintentional abrupt movement of the tractor from its position of rest upon initial movement of the manual control lever. The gradual slope near maximum forward and reverse portions of the camming surfaces afford gentle deceleration of the tractor upon initial movement of the control lever 51 toward neutral from its maximum forward and maximum reverse positions.

Neutral Adjusting of the Control

The hydrostatic transmission control of this invention can easily be adjusted to its neutral condition by first placing the control lever 51 in its neutral position as illustrated in FIGS. 1 and 2, and then loosening the nut 81 and rotating the cam 36 to where the cam roller 31 aligns with the neutral indexing marks 101, 102. The nut 81 is then retightened. Next, the nut 46 on the shaft 39 of the cam 36 is loosened and the shaft 39 together with the cam 36 is shifted axially by rotating the nut 47 until the neutral position of the swash plate is obtained. This will coincide with zero output of the pump. Then the nut 46 is retightened.

Operation of the Control

When the operator desires to move the tractor forward, he will flex the control lever 51 laterally outwardly from the notch 88 and push the lever forwardly in the forward slot 111 of the quadrant 86. This movement will cause the link 52 to be moved fowardly, thus rotating the cam 36 clockwise as viewed in FIG. 1. This movement will cause the control arm 27 to be moved clockwise, as viewed in FIG. 5, which moves the swash plate of the pump 22 to a forward fluid delivery position thereby causing the motor 23 to operate in its forward propelling direction. In other words, as viewed in FIGS. 5 and 6, the cam portion 37 of the cam 36 will pivot upwardly and the cam roller 31 will be shifted to the right as the lower end of the slot 104 is engaged. During the initial movement of the control lever 51, the vehicle will slowly accelerate due to the gradual curvature of the cam surface 103 adjacent its neutral position. Smooth gradual changes in speed are obtained in the upper speed operating range in both forward and reverse by virtue of the gradual slope of the cam surface 103 near its opposite ends. This provides a slow deceleration upon initial movement of the control lever from maximum forward and reverse settings. The resilient plastic roller 31 dampens fluctuating stroking forces from the swash plate without excessive wear and noise.

The embodiments of the invention in which an exclusive property or privilege is claimed are defined as follows:

1. In combination with a forward-reverse hydrostatic transmission having a drive pump with a swash plate tiltable about an axis to either side of a neutral position to vary the volume output of said pump, operating means for controlling the movement of said swash plate, said operating means comprising:

a swash plate control arm pivotable about a first axis and connected to said swash plate to cause tilting movement thereof upon pivotal movement of said arm, a cam pivotable about a second axis perpendicular to said first axis including a cam surface having a neutral point and forward and reverse portions on opposite sides of said neutral point, said cam including a shaft disposed on said second axis, support means carrying said shaft, a cam follower on said control arm in spaced relation to said first axis and in engagement with said cam surface, a shiftable manual control member, link means interconnecting said manual control member and said cam whereby shifting movement of said manual control member effects pivotal movement of said cam about said second axis and adjustment means in cooperative engagement with said support means and shaft permitting axial adjustment of said shaft and cam relative to said support means, said adjustment means including relatively rotatable parts with cooperatively engaged threads coaxial with said shaft, said parts upon relative rotation being operable to effect said axial adjustment of said shaft to cause said cam follower to be disposed at said neutral point on said cam surface when said swash plate is in its neutral position.

2. The operating means of claim 1 wherein said cam follower comprises a resilient plastic roller rotatably mounted on said control arm.

* * * * *